United States Patent
Mathur

(10) Patent No.: US 11,073,504 B2
(45) Date of Patent: Jul. 27, 2021

(54) METHOD TO DETERMINE TRANSFORMATION OF KEROGEN TO OIL/GAS AT DIFFERENT MATURITIES USING STEP-WISE PYROLYSIS-GAS CHROMATOGRAPHY

(71) Applicant: OIL INDIA LIMITED, Assam (IN)

(72) Inventor: Neeraj Mathur, Assam (IN)

(73) Assignee: OIL INDIA LIMITED, Assam (IN)

( * ) Notice: Subject to any disclaimer, the term of this patent is extended or adjusted under 35 U.S.C. 154(b) by 131 days.

(21) Appl. No.: 15/748,096

(22) PCT Filed: Jul. 26, 2016

(86) PCT No.: PCT/IB2016/054442
§ 371 (c)(1),
(2) Date: Jan. 26, 2018

(87) PCT Pub. No.: WO2017/017602
PCT Pub. Date: Feb. 2, 2017

(65) Prior Publication Data
US 2018/0217112 A1    Aug. 2, 2018

(30) Foreign Application Priority Data
Jul. 27, 2015  (IN) .............................. 819/KOL/2015

(51) Int. Cl.
*G01N 30/88* (2006.01)
*G01N 30/68* (2006.01)
(Continued)

(52) U.S. Cl.
CPC ............ *G01N 30/88* (2013.01); *G01N 30/68* (2013.01); *G01N 2030/025* (2013.01); *G01N 2030/125* (2013.01); *G01N 2030/8854* (2013.01)

(58) Field of Classification Search
CPC ..................................................... G01N 30/88
(Continued)

(56) References Cited

U.S. PATENT DOCUMENTS 4,629,702 A  12/1986 Fan
5,394,733 A *  3/1995 Acholla ................. G01N 30/12
73/19.02
(Continued)

FOREIGN PATENT DOCUMENTS

EP         2202514 A2     6/2010

OTHER PUBLICATIONS

Ei Mon Han et al: "Characterization of kerogen using combined pyrolysis—GC-MS 13-15 and FT-IR in weathered and unweathered coals and coaly shales from the Central Myanmar Basin, Myanmar", Researches in organic geochemistry, Jan. 8, 2014 (Jan. 8, 2014), pp. 49-59, XP055324849.

(Continued)

*Primary Examiner* — Walter L Lindsay, Jr.
*Assistant Examiner* — PhilipMarcus T Fadul
(74) *Attorney, Agent, or Firm* — Merchant & Gould P.C.

(57) ABSTRACT

A method for evaluating a degree of transformation ratio of kerogen to oil and/or gas and/or gas to oil generation index using a pyrolysis gas chromatography is disclosed. The method comprises providing a rock sample in powdered form; determining, by a source rock analysis instrument, total organic carbon in said rock sample, remaining hydrocarbon generation potential in rock sample, and a maturity of rock sample; feeding said sample in a pyrolyzer if said sample satisfies a pre-defined condition; analyzing, said sample in said pyrolyzer, by heating said sample at a pre-specified pyrolysis temperature in pre-specified pyrolysis steps and for pre-specified pyrolysis time; determining, by a gas chromatograph, a peak area of hydrocarbons (Continued)

present in said sample analyzed; evaluating, in a said degree of transformation ratio of said sample to oil and/or gas and/or said gas to oil generation index.

15 Claims, 9 Drawing Sheets

(51) Int. Cl.
  *G01N 30/12* (2006.01)
  *G01N 30/02* (2006.01)

(58) Field of Classification Search
  USPC .......................................................... 73/23.38
  See application file for complete search history.

(56) References Cited

U.S. PATENT DOCUMENTS

| | | | |
|---|---|---|---|
| 2009/0145598 A1 | 6/2009 | Symington et al. | |
| 2013/0262069 A1* | 10/2013 | Leonard | E21B 43/00 703/10 |
| 2015/0330203 A1* | 11/2015 | Galford | G01N 33/241 700/275 |
| 2016/0139293 A1* | 5/2016 | Misra | G01V 3/30 702/7 |
| 2016/0341707 A1* | 11/2016 | Inan | G01N 30/12 |

OTHER PUBLICATIONS

Miriam C. Wright et al: "A new rapid method for shale oil and shale gas 13-15 assessment", FUEL, vol. 153, Mar. 4, 2015 (Mar. 4, 2015), pp. 231-239, XP055324850.

Frank Cheng-Yu Wang et al: "Pyrolysis Comprehensive Two-Dimensional Gas Chromatography Study of Petroleum Source Rock", Analytical Chemistry, vol. 79, No. 15, Aug. 1, 2007 (Aug. 1, 2007), pp. 5642-5650, XP055072554.

International Search Report and Written Opinion from International Patent Application No. PCT/IB2016/054442, dated Dec. 13, 2016, 14 pages.

* cited by examiner

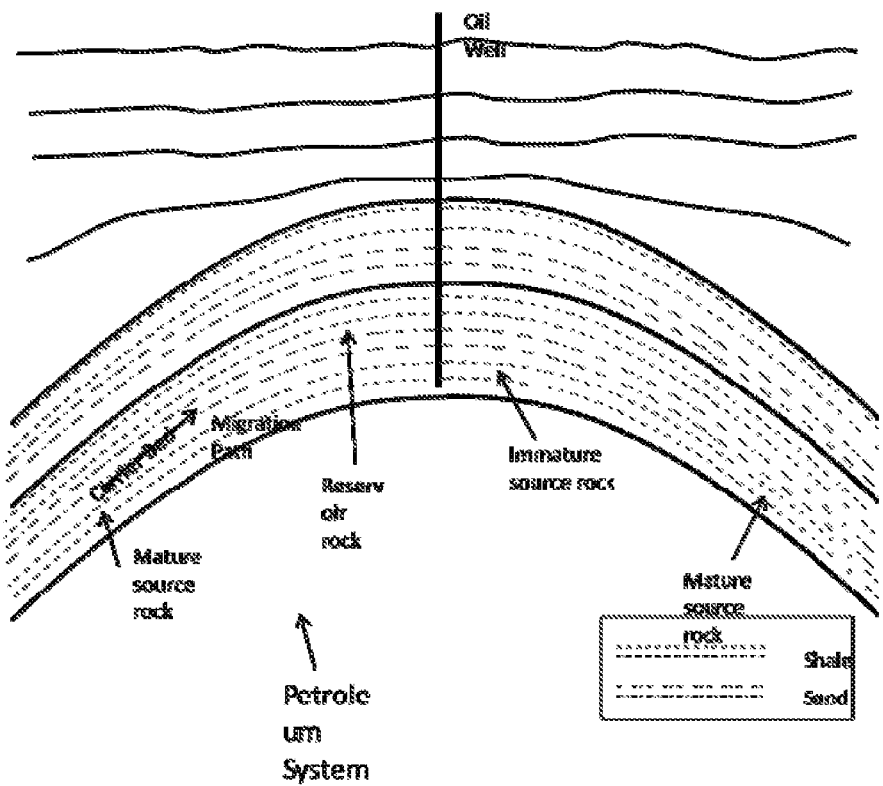
FIGURE 1 (PRIOR-ART)
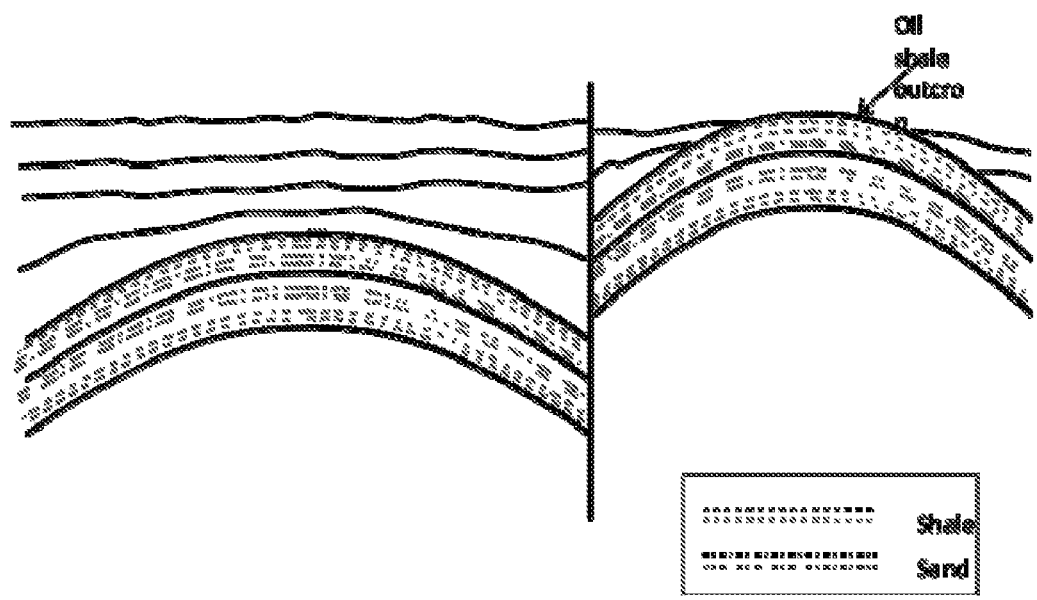
FIGURE 2 (PRIOR-ART)

METHOD TO DETERMINE TRANSFORMATION OF KEROGEN TO OIL/GAS AT DIFFERENT MATURITIES USING STEP-WISE PYROLYSIS-GAS CHROMATOGRAPHY

This application is a National Stage Application of International Patent Application No. PCT/IB2016/054442, filed 26 Jul. 2016, which claims benefit of Serial No. 819/KOL/2015, filed 27 Jul. 2015 in India and which applications are incorporated herein by reference. To the extent appropriate, a claim of priority is made to each of the above disclosed applications.

TECHNICAL FIELD

The present subject matter described herein, in general, relates to determining an amount of hydrocarbon present in a hydrocarbon-producing source rock and more particularly to analytical geochemistry methods to determine the degree of transformation of organic matter, kerogen, present in the petroleum source rocks, in to oil and gas with increase in maturity. In these methods, the source rock is subjected to pyrolysis at increasing temperatures in step-wise manner, for a certain period of time, to simulate the increase in maturity in the laboratory.

BACKGROUND

The generation, migration and entrapment of hydrocarbons occur in sedimentary basins. A sedimentary basin has layers of rocks where normally older rocks are deposited at deeper depths and the younger rocks are deposited at shallower depths. Different types of rocks are deposited in a basin. For example, shales are fine grained sedimentary rocks with low porosity and permeability. Shales are suitable for deposition and preservation of organic and can act as a source of hydrocarbons. Sandstones, on the other hand, are porous and permeable sedimentary rocks and are good reservoir for hydrocarbons.

A petroleum source rock is a shale that is also rich in organic matter. During the process of burial of the sedimentary rocks in a basin, the rocks are exposed to higher temperatures at deeper depths. The organic matter present in the petroleum source rocks, kerogen, becomes more mature when subjected to heating for long periods of time and is converted to hydrocarbons. First oil is generated and subsequently, gas is generated at higher temperatures. Thus, it can be said that with increasing maturity, petroleum source rock starts generating oil followed by gas.

FIG. 1 shows a typical petroleum system, where hydrocarbons are generated in organic rich and mature shale. Generated hydrocarbons are expelled from the shale and migrate through porous and permeable carrier beds to sandstone reservoir and accumulate. A low permeability seal rock above the reservoir rock prevents the hydrocarbons from escaping. A well is drilled in to the reservoir rock to tap the hydrocarbons.

Due to tectonic movement, the layers of rock buried deep inside the earth are moved to the surface. If an immature petroleum source rock occurs close to the surface, than it can be exploited as an oil shale (FIG. 2). An oil shale is an immature, organically rich shale from which hydrocarbon can be extracted by heating in a process plant or in situ.

As conventionally known, Kerogen is converted to oil and gas by heating over a period of time. Under geological conditions, it takes millions of years, at temperatures between 100° C. and 150° C. to generate oil and gas. However, the same process can be replicated in the laboratory by heating a small quantity of the source rock between 300° C. and 800° C. for very short duration of time under inert conditions.

A pyrolysis technique is used in the laboratory to evaluate the hydrocarbon generation potential of petroleum source rocks. In this technique, a small quantity of source rock sample is heated under inert conditions and the hydrocarbons thus generated are detected either directly using a flame ionization detector (FID) or analyzed using gas chromatograph equipped with flame ionization detector (GC-FID).

Pyrolysis gas chromatograph with Flame Ionization Detector (Py-GC-FID) instrument is used to get detailed information on the hydrocarbons generated during pyrolysis. The hydrocarbons generated from shale sample pass through the capillary column of the GC and are separated in to different components in order of their boiling points.

In a typical GC equipped with a 30 m long capillary column, hydrocarbons having number of carbon atoms ranging from 6 ($C_6$) to 36 ($C_{36}$) are separated. Gaseous hydrocarbons from $C_1$ to $C_5$ emerge as a single peak under these conditions. Thus, during pyrolysis gas chromatography, it is possible to determine the fraction of gaseous ($C_{1-5}$), light ($C_{6-14}$) and heavy ($C_{14}$+) hydrocarbons that are generated. In the pyrolysis gas chromatography method generally used various techniques as disclosed in "Pyrolysis studies and petroleum exploration" by Horsfield, 1984; "A pyrolysis-gas chromatographic method for kerogen typing", by Larter and Douglas, 1980; "Application of analytical pyrolysis techniques to kerogen characterization and fossil fuels exploration/exploitation. Analytical Pyrolysis Techniques and Applications", by Larter, 1984, and "Integrated kerogen typing in the recognition and quantitative assessment of petroleum source rocks" by Larter, 1985; "Analysis of source rocks, reservoir rocks and cap rocks by combined thermal extraction/pyrolysis gas chromatography", by Solli and Leplat, 1984, wherein the shale is thermally extracted at 300° C. to characterize the hydrocarbons already generated by the shale, followed by pyrolysis at a fixed temperature, say 600° C. to characterize and determine the fraction of oil and gas the shale will generate eventually when it is fully mature and all the organic matter in the shale that can convert in to hydrocarbons has converted.

In the prior-art, there are various studies using step wise pyrolysis have also been carried out previously. For example, "Stepwise Pyrolysis-gas chromatography of kerogen in sedimentary rocks", by Leventhal (1976) carried out a pyrolysis of kerogen at different temperatures to study the products generated by them. Leventhal found out that kerogens from different shale generate different molecules when subjected to pyrolysis. Ishiwatari (1993) also studied kerogens using step-wise pyrolysis gas chromatography and observed that different molecules are generated on pyrolysis at different temperatures. Horsfield et al (1989) pyrolysed shales at 300° C., 330° C. and 350° C. for three days and analyzed the products separately using a gas chromatograph. Hydrous pyrolysis studies were carried out to study the conversion of kerogen to petroleum under different conditions (by various scientist and researchers viz., Lewan, 1985;1993, Lewan and Henry, 1999, Winter and Williams, 1983). Further a patent document EP2202514A2 describes a method to predict the composition of petroleum that will be expelled from kerogen on maturation.

In spite of the above and other available research in the prior-art, there still exists below mentioned drawbacks:

1. During exploration of conventional and unconventional hydrocarbons, the following information is also required:
    i. Degree of transformation of kerogen to total hydrocarbons, gaseous hydrocarbons, light hydrocarbons and heavy hydrocarbons at different maturity levels. This information is required during petroleum system modeling for conventional and unconventional hydrocarbons.
    ii. Maturity at the onset of oil generation and gas generation. This information is required for exploration of unconventional shale oil and shale gas prospects.
    iii. Optimizing pyrolysis conditions for conversion of oil shale to hydrocarbons in process plants or the subsurface of the earth.
2. Further, using the techniques mentioned in prior art above, it is not possible to determine the maturity at which the shale will start generating significant amount of oil and the maturity at which it will start generating significant amount of gas. Further, it is not possible to determine the transformation ratio of kerogen to hydrocarbons (gas, light oil, heavy oil) at different maturity levels. However, it is possible to determine theoretically the degree of transformation of kerogen with increase in maturity using petroleum system modeling software and kerogen kinetics.

SUMMARY

This summary is provided to introduce concepts related to Method to Determine Transformation of Kerogen to Oil/Gas at Different Maturities Using Step-wise Pyrolysis-Gas Chromatography and the concepts are further described below in the detailed description. This summary is not intended to identify essential features of the subject matter nor is it intended for use in determining or limiting the scope of the subject matter.

It is one aspect of the present invention to provide a step-wise pyrolysis gas chromatographic method that overcomes the above shortcomings. With this method, it is possible to quantify the fraction of kerogen that is converted to hydrocarbons (gas, light oil and heavy oil) at different pyrolysis conditions. It is also possible to determine the pyrolysis conditions at onset of oil generation and gas generation and gas: oil generation ratio at under different pyrolysis conditions. Further, different pyrolysis conditions (temperature and time) have been converted in to equivalent maturity level so that data obtained may be correlated to geological hydrocarbon generation process.

It is another aspect of the present invention to determine the degree of transformation of kerogen in to total hydrocarbons or gas, light hydrocarbons and heavy hydrocarbons, with increase in maturity of the shale. Further, the maturity of the shale at the onset of oil generation and gas generation may also be determined. This invention provides real data to calibrate the petroleum system model. The data obtained using this technique may also be used to optimize the pyrolysis conditions to convert an oil shale in to hydrocarbons.

It is yet another aspect of the present invention to provide a method to determine transformation of kerogen to oil/gas at different maturities using step-wise pyrolysis-gas chromatography.

Accordingly, in one implementation, a method for evaluating a degree of transformation ratio of kerogen to oil and/or gas and/or gas to oil generation index using a pyrolysis gas chromatography is disclosed. The method comprises:

providing, to a source rock analysis instrument, a rock sample in powdered form;

determining, by said source rock analysis instrument, total organic carbon (TOC) in said rock sample, remaining hydrocarbon generation potential (S2) in rock sample, and a maturity (Tmax) of rock sample;

feeding said sample in a tube of a pyrolyzer if said sample satisfies a pre-defined condition;

analyzing, said sample in said pyrolyzer, by heating said sample at a pre-specified pyrolysis temperature in pre-specified pyrolysis steps and for pre-specified pyrolysis time;

determining, by a gas chromatograph, a peak area of hydrocarbons present in said sample analyzed;

evaluating, in a said degree of transformation ratio of said sample to oil and/or gas and/or said gas to oil generation index.

In one implementation, the method further includes converting pyrolysis conditions (temperature and time) at each pyrolysis step to calculated vitrinite reflectance;

plotting of calculated vitrinite reflectance against transformation ratios and gas:oil generation index; calculating time required to attain vitrinite reflectance at 50% and 80% transformation ratio, if the pyrolysis temperature is 350° C. and 400° C.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 1 illustrates a schematic diagram showing sedimentary rock layers and petroleum system available in the prior-art.

FIG. 2 illustrates a schematic diagram showing occurrence of oil shale in sedimentary basin available in the prior-art.

DETAILED DESCRIPTION OF THE PRESENT INVENTION

Figure 3:
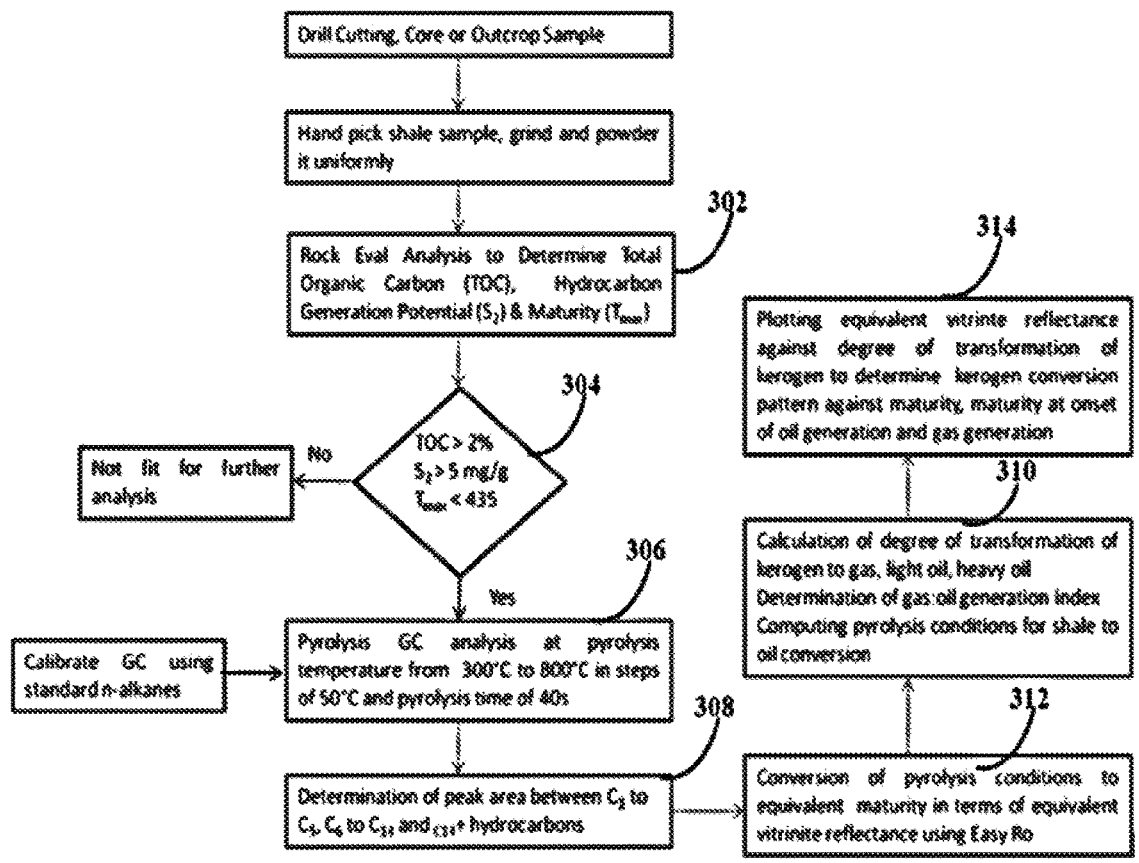
FIG. 3 illustrates a method to determine transformation of kerogen to oil/gas at different maturities using step-wise pyrolysis-gas chromatography, in accordance with an embodiment of the present subject matter.

Though most of the terms used in this document may be familiar to the person skilled in that art, still for clear and precise understanding the terms used, below provided is the definition of some terminologies commonly used in this document:

Sedimentary Rock: It is one of the rock types that forms the earth's crust

Shale: It is a sedimentary rock that is very fine grained and has low porosity and permeability Kerogen: Organic matter present in the shale, that is insoluble in organic solvents. Kerogen is converted in to hydrocarbons on heating.

Petroleum Source Rock: It is organically rich shale that is capable of generating hydrocarbons on heating or has already generated hydrocarbons. Kerogen is present in significant quantity in petroleum source rock.

Oil shale: It is a petroleum source rock that has low thermal maturity. With the result, no hydrocarbon generation has yet taken place in an oil shale.

Shale oil: It is the oil present in the petroleum source rock that has been generated but not yet expelled. For petroleum source rock to generate oil, it must be thermally mature to be in oil generation window.

Shale gas: It is the gas present in the petroleum source rock that has been generated but not yet expelled. For petroleum source rock to generate gas, it must be thermally highly mature to be in gas generation window.

Pyrolysis: It is the process of heating a sample in the absence of oxygen or in inert atmosphere Gas Chromatograph: It is an instrument used for separation of complex mixtures. It is usually equipped with an injector, column and detector. For hydrocarbon analysis, split/split less injector, capillary column and flame ionization detector are generally used in a gas chromatograph.

Vitrinite reflectance: Vitrinite is an organic particle or maceral present in coal and shale. When coal or shale is subjected to higher temperature associated with the burial of the rock in the sub surface of the earth, it becomes more thermally mature. Vitrinite particles in a coal or shale can be examined under the microscope after preparation of a polished sample of coal or shale. When examined under the microscope, the light reflected by a vitrinite particle increases with increase in maturity of the coal or shale. Thus, vitrinite reflectance (Ro) is used as a maturity parameter for coal or shale. Vitrinite reflectance may also be calculated theoretically (Rc) if the thermal history of the rock is known. Computer programs like Easy Ro are used for this purpose. In addition to the heating of the rocks under geological conditions, the rock samples may also be pyrolysed in a laboratory. The process of pyrolysis is equivalent to the process of heating of rocks in the sub surface of the earth. Thus, pyrolysis of rocks will lead to an increase in their maturity and the same may be calculated theoretically using computer program Easy Ro.

Pyrolysis gas chromatography is a standard technique for evaluation of oil/gas generation potential of kerogen. In this technique, an organically rich shale/source rock, that has significant amount of kerogen present in it, is heated at 300° C. in the pyrolyzer and the bitumen present in the rock is volatilized and transferred to gas chromatograph for detailed analysis. This step is called thermal extraction as no kerogen is converted to hydrocarbons and only the hydrocarbons already present in the shale are volatilized. In the next step, the same sample is heated to 600° C. in the pyrolyzer during which time kerogen is converted to hydrocarbons. The hydrocarbons are again transferred to gas chromatograph for detailed analysis. Depending on the type of kerogen, the pyrolysis temperature in the second step may be higher, for example 650° C. or 700° C. It is presumed that during the pyrolysis at elevated temperature, all the pyrolyzable kerogen is converted in to hydrocarbons. Therefore, by examining the hydrocarbons generated during pyrolysis at elevated temperature, it is possible to determine whether the kerogen will generate predominantly oil or gas or any other mixture of both.

The present invention provides a step-wise pyrolysis gas chromatography to artificially mature an immature shale sample, in steps and determine the fraction of kerogen that has converted to gas, light oil and heavy oil at each maturity step.

In the prior-art a step-wise pyrolysis gas chromatography has been used earlier to determine the type of molecules that are generated on pyrolyzing at different temperatures is disclosed, but it has not been used to measure the degree of transformation of kerogen to different types of hydrocarbons. Moreover, pyrolysis conditions at each temperature have not been converted to equivalent maturity using any methodology earlier.

In the prior-art a single step pyrolysis gas chromatography, after thermal extraction at 300° C., has been used to measure the fraction of gas, light oil and heavy oil generated from a shale when it is artificially matured completely in a single step and not in step-wise manner. Thus, variation of degree of transformation of kerogen to gas, light oil and heavy oil with increase in maturity has not been measured earlier.

In the prior-art a Gas: oil generation index has also been measured earlier during single step pyrolysis gas chromatography but the variation of gas:oil generation index with increase in maturity as measured by step-wise pyrolysis gas chromatography has not been done earlier.

In the prior-art a conversion of pyrolysis conditions to calculated vitrinite reflectance and using the relationship between degree of transformation of kerogen and calculated Vitrinite reflectance to evaluate shale oil/gas potential has not been done earlier.

The present invention provides step-wise pyrolysis where an immature shale sample is pyrolysed at increasing temperature in steps to artificially mature to full maturity and determine the degree of transformation of kerogen at each maturity level. Further, the pyrolysis conditions at each temperature are converted to equivalent maturity and the same is plotted against degree of transformation of kerogen.

The present invention provides a method which is step-wise pyrolysis gas chromatographic method that overcomes the above shortcomings. With this method, it is possible to quantify the fraction of kerogen that is converted to hydrocarbons (gas, light oil and heavy oil) at different pyrolysis conditions. It is also possible to determine the pyrolysis conditions at onset of oil generation and gas generation and gas: oil generation ratio under different pyrolysis conditions. Further, different pyrolysis conditions (temperature and time) have been converted in to equivalent maturity level so that data obtained may be correlated to geological hydrocarbon generation process.

With this method as disclosed in the present invention, it is possible to determine the degree of transformation of kerogen in to total hydrocarbons or gas, light hydrocarbons and heavy hydrocarbons, with increase in maturity of the shale. Further, the maturity of the shale at the onset of oil generation and gas generation may also be determined. This invention provides real data to calibrate the petroleum system model. The data obtained using this technique may also be used to optimize the pyrolysis conditions to convert an oil shale in to hydrocarbons.

A step-wise pyrolysis gas chromatographic technique has been developed to determine the fraction of pyrolyzable kerogen, present as organic matter in shale that may be converted to oil and gas at different maturity levels. The flow chart of the technique is shown in FIG. 3. The equipment consists of a pyrolyzer connected to a gas chromatograph-flame ionization detector (Py-GC-FID). A schematic drawing of the equipment is shown in FIG. 4.

Figure 4:
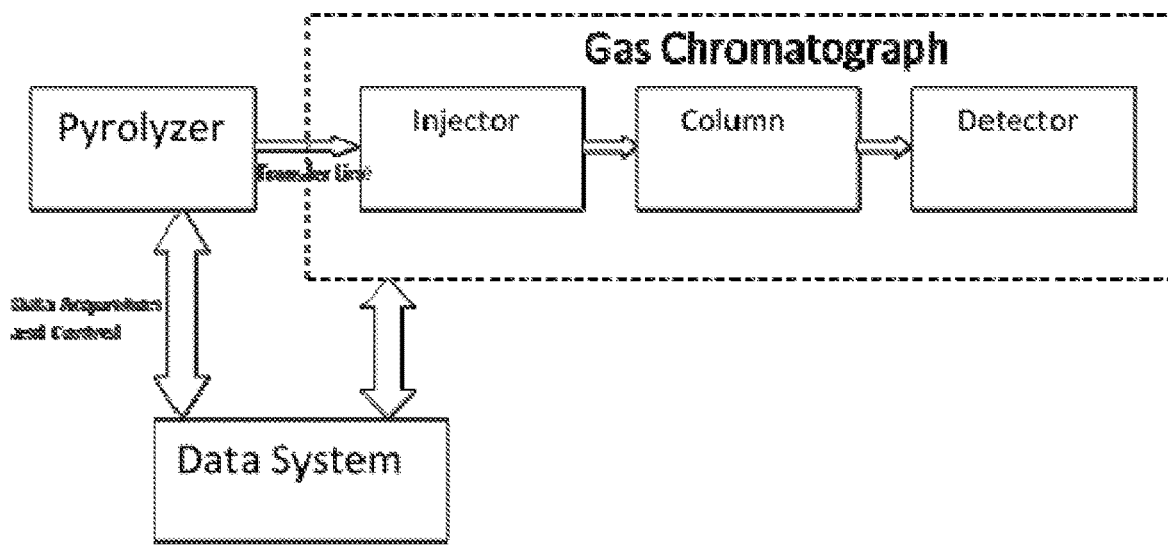
FIG. 4 illustrates a schematic diagram of a pyrolysis gas chromatograph System, in accordance with an embodiment of the present subject matter.

In one implementation, a schematic drawing of the equipment is shown in FIG. 4. While developing the technique, CDS5500 pyrolyzer and Agilent 7890 gas chromatograph were used. The pyrolyzer is connected to the gas chromatograph through a heated transfer line. The pyrolyzer consists of an auto sampler, pyrolysis chamber and the control unit. The pyrolysis chamber may be heated up to 1100° C. The sample is loaded on to a quartz tube which is kept in the auto sampler of the pyrolyzer. CDS pyrolysis software is used to control the pyrolyzer. An Agilent Chemstation software is used to control the gas chromatograph.

In one implementation, the Pyrolyzer was programmed to pyrolyze the sample in the following temperature steps in the Table 1 below:

TABLE 1

PYROLYZE THE SAMPLE WITH THE TEMPERATURES

| Step | Pyrolysis temperature | Pyrolysis time |
| --- | --- | --- |
| 1st step | 300° C. | 40 s |
| 2nd step | 350° C. | 40 s |
| 3rd step | 400° C. | 40 s |
| 4th step | 450° C. | 40 s |
| 5th step | 500° C. | 40 s |
| 6th step | 550° C. | 40 s |
| 7th step | 600° C. | 40 s |
| 8th step | 650° C. | 40 s |
| 9th step | 700° C. | 40 s |
| 10th step | 750° C. | 40 s |
| 11th step | 800° C. | 40 s |

Other pyrolysis conditions were maintained as:
Equilibration time: 6 s
Purge time: 6 s
Post pyrolysis time: 60 s In one implementation, the transfer line between pyrolyzer and gas chromatograph was maintained at 300° C. The products generated during pyrolysis are immediately transferred to the gas chromatograph through the heated transfer line. The gas chromatograph is equipped with a capillary column and the pyrolysis products are separated while eluting through the column and detected by flame ionization detector.

In one implementation, the following conditions were maintained in the gas chromatograph:
Capillary Column: HP-1 (Non polar)
Length: 60 m,
Internal Diameter: 0.25 mm,
Film Thickness: 0.25μ
Carrier gas: Helium at 1 mL/min
Injector temperature: 300° C.
Septum purge: 3 mL/min
Detector temperature: 320° C.
Hydrogen flow: 30 mL/min
Air flow: 300 mL/min
Make up (N2) flow: 20 mL/min
Oven temperature program: 40° C. (hold time 5 min)–8° C./min–310° C. (hold time 15 min)

In one implementation, the samples analyzed using the technique as disclosed in the present invention, may be either drill cutting or core samples retrieved from a drilling well (FIG. 1) or it could be outcrops (FIG. 2) collected during geological field trip. Shale present in the cuttings, core or outcrops is identified visually and hand-picked. The shale is ground to fine powder and homogenized. Shale is first analyzed using a source rock analysis instrument. In one implementation, said source rock analysis instrument may be using a publicly available Rock Evaluation instrument. It may be understood by the person skilled in that art that one variant of rock analysis instrument is called "Rock Eval" developed by IFP (French Petroleum Institute) and marketed by Vinci Technologies, France. However, other models developed by other companies may also be used in the present invention. Only the shale samples having high total organic carbon (TOC>2%), high remaining hydrocarbon generation potential (S2>5 mg hydrocarbons/g TOC) and are immature (Tmax<435° C.) are selected for analysis using this technique (as shown in FIG. 3).

In one implementation, about 30 mg of the powdered shale sample was taken in the quartz tube of the pyrolyzer. The quartz tube was loaded on to the pyrolyzer. The hydrocarbons generated after pyrolysis were transferred to gas chromatograph through a transfer line maintained at 300° C.

In one implementation, prior to analysis of shale samples, retention times of n-alkanes from C5 to C30 were determined. Standard n-alkanes, n-hexane ($C_6H_{12}$), n-heptane ($C_7H_{14}$), n-dodecane ($C_{12}H_{26}$), n-hexadecane ($C_{16}H_{34}$), n-eicosane ($C_{20}H_{42}$), n-tetracosane ($C_{24}H_{50}$) and n-octacosane ($C_{28}H_{58}$) were analyzed using the pyrolysis gas chromatograph system and the above temperature program. Using the retention times of n-alkanes, chromatogram was divided in to three parts. The area of all the peaks eluting before n-$C_5$ correspond to gaseous fraction ($C_1$ to n-$C_5$), area of all the peaks eluting between n-$C_5$ and n-$C_{14}$ corresponds to light oil and area of all the peaks eluting beyond n-$C_{14}$ corresponds to heavy oil generated during pyrolysis of shale. For every run, the area of peaks between $C_1$ and n-$C_5$, n-$C_5$ and n-$C_{14}$ and n-$C_{14}$+ were determined.

In one implementation, based on above data, transformation ratio of kerogen to gas, light oil and heavy oil at each pyrolysis temperature was determined as follows:

Total area=Area of $C_1$ to $n$-$C_5$ Compounds+Area of $n$-$C_5$ to $n$-$C_{14}$ Compounds+Area of $n$-$C_{14}$+Compounds for $1^{st}$ run+Area of $C_1$ to $n$-$C_5$ Compounds+Area of $n$-$C_5$ to $n$-$C_{14}$ Compounds+ Area of $n$-$C_{14}$+Compounds for $2^{nd}$ run+Area of $C_1$ to $n$-$C_5$ Compounds+Area of $n$-$C_5$ to $n$-$C_{14}$ Compounds+Area of $n$-$C_{14}$+Compounds for $11^{th}$ run Gas transformation ratio(after$n^{th}$ run)=Sum of area of $C_1$ to $n$-$C_5$ Compounds of $1^{st}$ to $n^{th}$ run*100/ Total Area Light oil transformation ratio(after$n^{th}$ run)=Sum of area of $n$-$C_5$ to $n$-$C_{14}$ Compounds $1^{st}$ to $n^{th}$ run*100/Total Area Heavy oil transformation ratio(after$n^{th}$ run)=Sum of area of $n$-$C_{14}$+Compounds $1^{st}$ to $n^{th}$ run*100/ Total Area Transformation ratio(after$n^{th}$ run)=(Sum of area of $C_1$ to $n$-$C_5$ Compounds of $1^{st}$ to $n^{th}$ run+Sum of area of $n$-$C_5$ to $n$-$C_{14}$ Compounds $1^{st}$ to $n^{th}$ run+ Sum of area of $n$-$C_{14}$+Compounds $1^{st}$ to $n^{th}$ run)*100/Total Area In one implementation, using above calculations, gas transformation, light oil transformation ratio, heavy oil transformation ratio and total transformation ratio at each pyrolysis temperature were determined. The transformation ratio corresponds to the fraction of kerogen that has converted to hydrocarbons.

In one implementation, gas: oil generation index is determined. The Gas: oil generation index for every run may be determined as follows:

Gas: oil generation index(for $n^{th}$ run)=(Area of $C_1$ to $n$-$C_5$ Compounds)/(Area of $n$-$C_5$ to $n$-$C_{14}$ Compounds+Area of $n$-$C_{14}$+Compounds) for $n^{th}$ run In one implementation, the conversion of pyrolysis conditions (temperature and time) to equivalent maturity in terms of calculated vitrinite reflectance may be determined theoretically using a program Easy Ro (Sweeney and Burnham, 1990). Using this program, available in a spreadsheet, maturity level attained after each pyrolysis step has been calculated as is shown in the table 2 below:

TABLE 2

EQUIVALENT VITRINITE REFLECTANCE (CALCULATED USING EASY RO) AFTER STEP-WISE PYROLYSIS AT DIFFERENT TEMPERATURES

| Temperature (° C.) | Time (s) | Vitrinite Reflectance (VRc (%)) |
|---|---|---|
| 300 | 40 | 0.24 |
| 350 | 40 | 0.34 |
| 400 | 40 | 0.47 |
| 450 | 40 | 0.65 |
| 500 | 40 | 0.87 |
| 550 | 40 | 1.28 |
| 600 | 40 | 1.86 |
| 650 | 40 | 2.60 |
| 700 | 40 | 3.39 |
| 750 | 40 | 4.05 |

In one implementation, during the pyrolysis gas chromatographic study, samples were heated at temperatures ranging from 300° C. to 800° C. for very short duration of time (40 s at each temperature step). The maturity attained in terms of equivalent Vitrinite reflectance has been calculated using Easy Ro. The same level of maturity may also be attained if the shale is heated at lower temperatures say, 350° C. and 400° C. for longer duration of time. Time required to attain the same maturity level as shown in Table 2, when the shale is heated at 350° C. and 400° C., have been calculated using Easy Ro and are shown in Table 3 below.

In one implementation, several different shale samples from Upper Assam Basin and other basins have been analyzed using this technique and the transformation ratio (gas, light oil, heavy oil and total) and gas: oil generation index have been determined. These transformation ratios and gas: oil generation index have been plotted against the maturity level (calculated vitrinite reflectance, Rc) of the shales as calculated by the Easy Ro method. These plots may be used to predict gas, light oil and heavy oil generation by shale at different maturity levels. This information is very useful in petroleum system modeling studies and shale oil/gas exploration.

TABLE 3

TIME REQUIRED TO ATTAIN MATURITY LEVELS MENTIONED IN TABLE 2 ON HEATING THE SHALE AT DIFFERENT TEMPERATURES

| Vitrinite Reflectance (%) | Time required (in days) to attain maturity at temperature | |
|---|---|---|
| | 350° C. | 400° C. |
| 0.47 | 0.05 | 0.003 |
| 0.65 | 0.83 | 0.04 |
| 0.87 | 15 | 0.67 |
| 1.28 | 230 | 8.5 |
| 1.86 | 3800 | 120 |
| 2.60 | | 1550 |

In one implementation, the time required to attain the equivalent vitrinite reflectance while heating at 350° C. and 400° C. has also been calculated. The transformation ratio has been plotted against time required to attain the equivalent maturity levels on heating at 350° C. and 400° C. This information helps in optimizing the pyrolysis conditions for conversion of oil shale to hydrocarbons.

Accordingly, in one implementation, a method for evaluating a degree of transformation ratio of kerogen to oil and/or gas and/or gas to oil generation index using a pyrolysis gas chromatography is disclosed.

At step 302, the drill cutting sample from the well or outcrop sample from the field is received; shale samples are picked and powdered for analysis.

At step 304, the source rock analysis instrument or the rock evaluation instrument determines, total organic carbon (TOC) in said rock sample, remaining hydrocarbon generation potential (S2) in rock sample, and a maturity (Tmax) of rock sample.

At block 306, if said sample satisfies a pre-defined condition, said sample is fed in a tube of a pyrolyzer. The pyrolyzer analyzes said sample in said pyrolyzer, by heating said sample at a pre-specified pyrolysis temperature in pre-specified pyrolysis steps and for pre-specified pyrolysis time. In one implementation, said sample is heated, preferably, at pre-specified pyrolysis temperature from 300° C. to 800° C. in said pre-specified pyrolysis steps of 50° C. and for said pre-specified pyrolysis time 40 seconds. At each temperature step, generated hydrocarbons are analyzed using gas chromatograph and peak area of hydrocarbons is determined using gas chromatographic software.

At step 308, total area of hydrocarbons for all the runs is computed.

At step 310, said degree of transformation ratio of said sample to oil and/or gas and/or said gas to oil generation index is evaluated.

In one implementation, the present invention provides a method for evaluating said transformation of said sample to said oil and/or gas and/or said gas to oil generation index at different maturities (temperatures) using a step-wise pyrolysis-gas chromatography.

In one implementation, said sample is a kerogen sample preferably selected form a shale rock. However, it may be understood by the person skilled in that art that any sample with presence of hydrocarbons may be used in the method as disclosed in the present invention.

In one implementation, said pyrolyzer comprises at least one auto-sampler, at least one pyrolysis chamber, and at least one control unit.

In one implementation, said sample is fed in pyrolysis chamber, preferably a quartz tube, of said pyrolyzer enclosed in said auto-sampler and said pyrolyzer is controlled using said control unit, preferably comprising at least one controlling software.

In one implementation, said gas chromatograph comprises at least one injector, at least one capillary column, and at least one flame ionization detector, and said gas chromatograph is controlled preferably using at least one controlling software.

In one implementation, after analyzing said sample from said pyrolyzer is transferred to said gas chromatograph using at least one transfer line, said transfer line preferably maintained at 300° C., and said capillary column in said gas chromatograph is adapted to separate hydrocarbons present in said sample to be detected by said flame ionization detector.

In one implementation, before analyzing the method comprises
- injecting, in said injector, n-alkanes comprising n-hexane ($C_6H_{12}$), n-heptane ($C_7H_{14}$), n-dodecane ($C_{12}H_{26}$), n-hexadecane ($C_{16}H_{34}$), n-eicosane ($C_{20}H_{42}$), n-tetracosane ($C_{24}H_{50}$) and n-octacosane ($C_{28}H_{58}$);
- analyzing, by said capillary column, said n-alkanes, preferably from $C_5$ to $C_{30}$ for determining retention time for said n-alkanes;
- dividing, using said controlling software, a chromatogram preferably into three parts based on said retention time determined of said n-alkanes, wherein said chromatogram depicts at least one of:
  - an area of all the peaks eluting before n-$C_5$ correspond to gaseous fraction ($C_1$ to n-$C_5$); or
  - an area of all the peaks eluting between n-$C_5$ and n-$C_{14}$ corresponds to light oil; or
  - and area of all the peaks eluting beyond n-$C_{14}$ corresponds to heavy oil generated during pyrolysis of said sample; or combination thereof.

In one implementation, said predefined condition preferably is, said sample is fed if said TOC>2%, said ($S_2$)>5 mg/g and said ($T_{max}$)<435° C.

In one implementation, said degree of transformation ratio of kerogen to oil and/or gas is determined, preferably using an equation: (sum of area of $C_1$ to n-$C_5$ Compounds of $1^{st}$ to $n^{th}$ run Sum of area of n-$C_5$ to n-$C_{14}$ Compounds $1^{st}$ to $n^{th}$ run+Sum of area of n-$C_{14}$+Compounds $1^{st}$ to $n^{th}$ run)*100/Total Area. In one implementation, Peak area of hydrocarbons after each run is determined using gas chromatographic software. Peak area of all the run is summed up as Total Area and Degree of Transformation is calculated using equations shown in step 310.

In one implementation, said gas to oil generation index said sample is determined using said controlling software in said gas chromatograph, preferably using an equation:

(Area of $C_1$ to n-$C_5$ Compounds)/(Area of n-$C_5$ to n-$C_{14}$ Compounds+Area of n-$C_{14}$+Compounds) for $n^{th}$ run.

In one implementation, the method also comprises determining conversion (312) of said pre-specified pyrolysis conditions (temperature and time) to an equivalent maturity in terms of calculated vitrinite reflectance, preferably using an Easy Ro program in the form of at least one report depicting maturity level attained by said sample after each pyrolysis step, for respective time and respective vitrinite reflectance in percentage.

In one implementation, the method comprises plotting (314) a graph depicting said vitrinite reflectance against said degree of transformation attained by said sample after each pyrolysis step.

In one implementation, said transformation ratio of said sample to oil and/or gas corresponds to a fraction of said kerogen that is converted into hydrocarbons.

Figure 5:
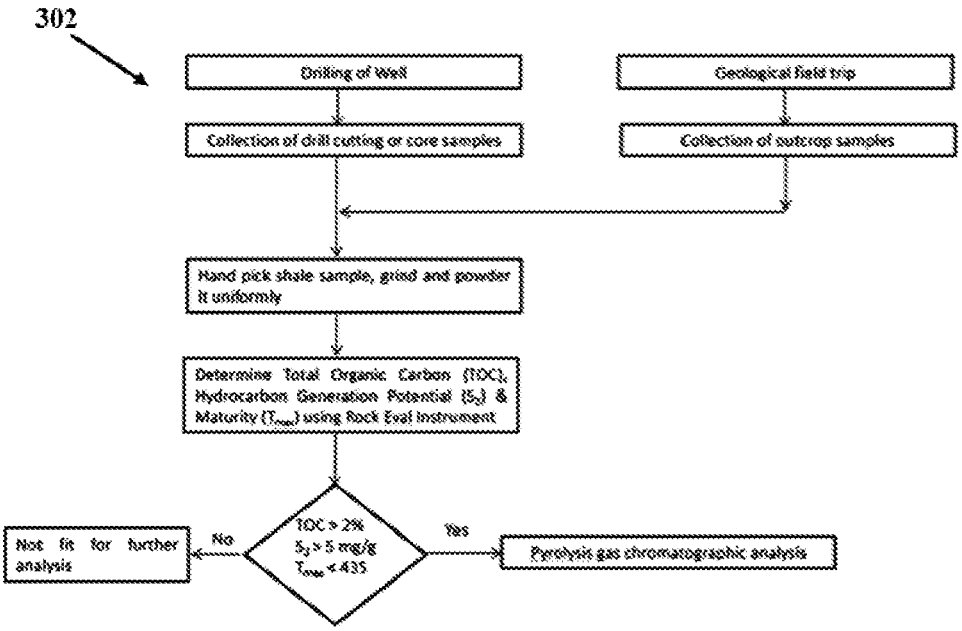
FIG. 5 illustrates step 302: a flow chart for obtaining the sample, in accordance with an embodiment of the present subject matter.

Referring now to FIG. 5 illustrates step 302: a flow chart for obtaining the sample, in accordance with an embodiment of the present subject matter. In one implementation, said sample may be obtained by drilling a well, collection of drill cutting or core samples, Hand picking shale sample, grind and powder it uniformly.

Figure 6:
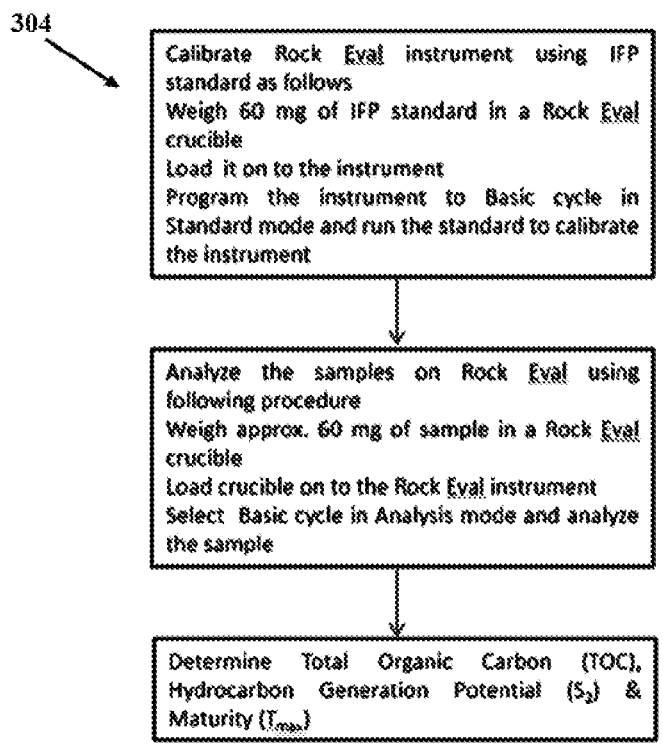
FIG. 6 illustrates step 304: a flow chart for screening of samples using source rock analysis instrument, in accordance with an embodiment of the present subject matter.

Referring now to FIG. 6 illustrates step 304: a flow chart for screening of samples using said source rock analysis instrument, in accordance with an embodiment of the present subject matter. In one implementation, source rock analysis instrument called Rock Eval instrument may be calibrated using an IFP standard as follows:
- Weigh 60 mg of IFP standard in a Rock Eval crucible;
- Load it on to the instrument
- Program the instrument to Basic cycle in Standard mode and run the standard to calibrate the instrument.

In one implementation, the samples are analyzed on Rock Eval using following procedure
- Weigh approx. 60 mg of sample in a Rock Eval crucible
- Load crucible on to the Rock Eval instrument Select Basic cycle in Analysis mode and analyze the sample Determine Total Organic Carbon (TOC), Hydrocarbon Generation Potential ($S_2$) and Maturity ($T_{max}$)

Figure 7:
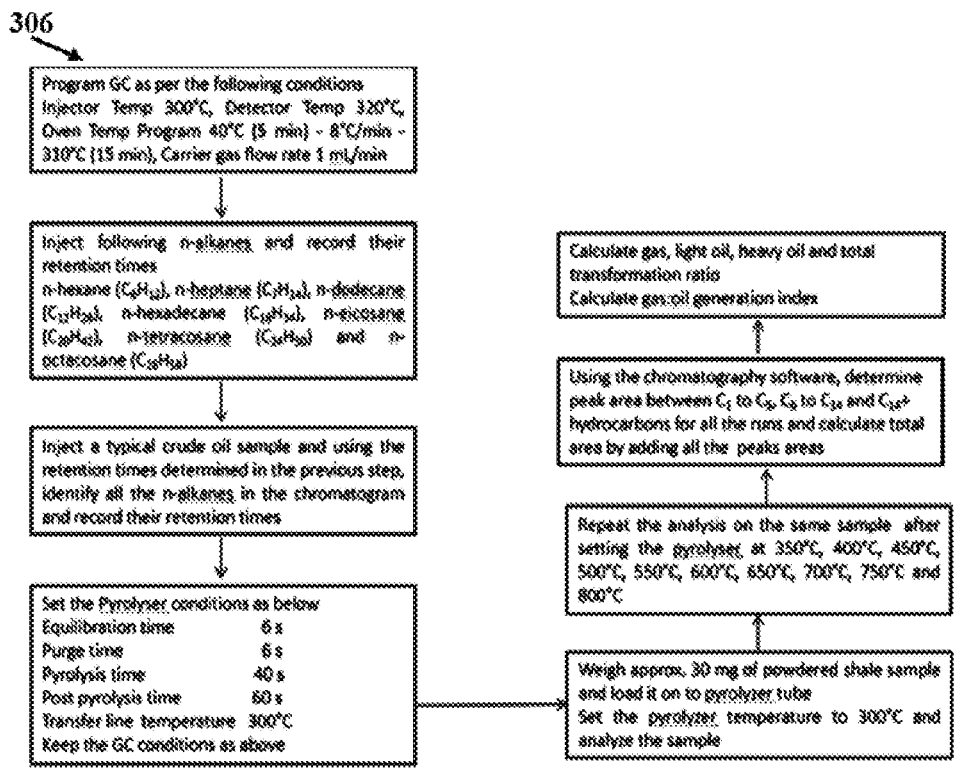
FIG. 7 illustrates step 306: a flow chart for analysis using step-wise Pyrolysis Gas Chromatography, in accordance with an embodiment of the present subject matter.
Figure 8:
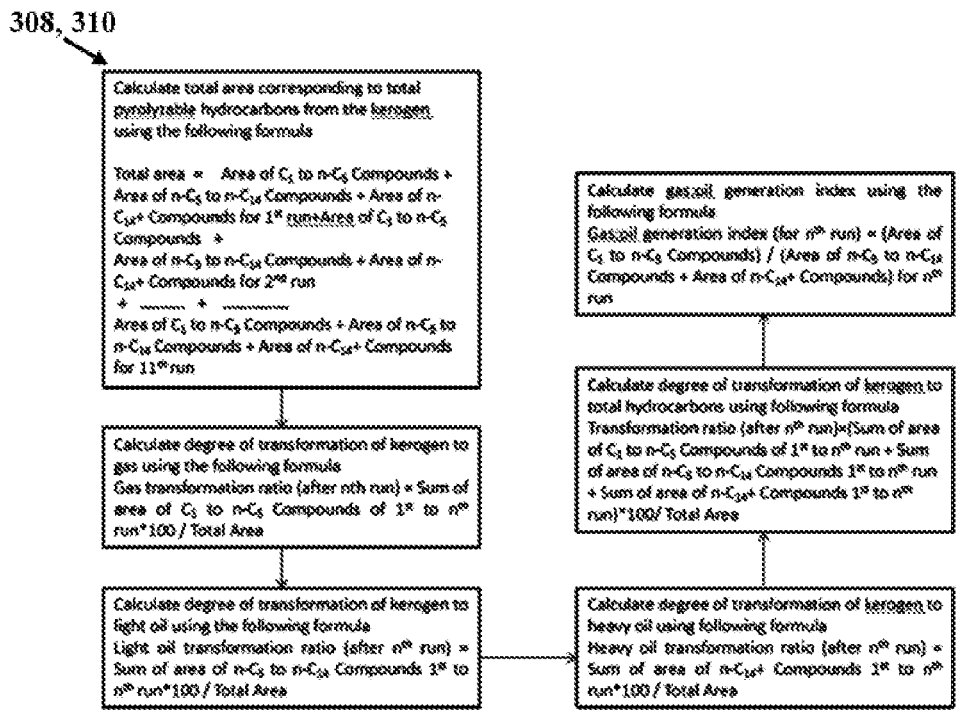
FIG. 8 illustrates step 308, 310: a flow chart for determination of degree of transformation of kerogen, in accordance with an embodiment of the present subject matter.

Referring now to FIG. 7 illustrates step 306: a flow chart for analysis using step-wise pyrolysis gas chromatography (GC), in accordance with an embodiment of the present subject matter. In one implementation below mentioned steps may be performed for analysis of said sample using step-wise pyrolysis gas chromatography Pyrolysis Gas Chromatography: Program GC as per the following conditions :Injector Temp 300° C., Detector Temp 320° C., Oven Temp Program 40° C. (5 min)–8° C./min–310° C. (15 min), Carrier gas flow rate 1 mL/min, Septum purge flow rate 3 mL/min, Detector hydrogen flow rate 30 mL/min, Detector air flow rate 300 mL/min, Detector make up flow rate 20 mL/min;

Inject following n-alkanes and record their retention times n-hexane ($C_6H_{12}$), n-heptane ($C_7H_{14}$), n-dodecane ($C_{12}H_{26}$), n-hexadecane ($C_{16}H_{34}$), n-eicosane ($C_{20}H_{42}$), n-tetracosane ($C_{24}H_{50}$) and n-octacosane ($C_{28}H_{58}$);

Inject a typical crude oil sample and using the retention times determined in the previous step, identify all the n-alkanes in the chromatogram and record their retention times;

Set the Pyrolyser conditions as Equilibration time: 6 s, Purge time 6 s, Pyrolysis time 40 s, Post pyrolysis time 60 s, Transfer line temperature 300° C., Keep the GC conditions as above;

Weigh approx. 30 mg of powdered shale sample and load it on to pyrolyzer tube, set the pyrolyzer temperature to 300° C. and analyze the sample;

Repeat the analysis on the same sample after setting the pyrolyser at 350° C., 400° C., 450° C., 500° C., 550° C., 600° C., 650° C., 700° C., 750° C. and 800° C.;

Using the chromatography software, determine peak area between $C_1$ to $C_5$, $C_6$ to $C_{14}$ and $C_{14}$+ hydrocarbons for all the runs and calculate total area by adding all the peaks areas;

Calculate gas, light oil, heavy oil and total transformation ratio, and Calculate gas:oil generation index Referring now to FIG. 8 illustrates step 308, 310: a flow chart for determination of degree of transformation of kerogen, in accordance with an embodiment of the present subject matter. In one implementation, following steps may be performed for determination of degree of transformation of kerogen:

Calculate total area corresponding to total pyrolyzable hydrocarbons from the kerogen using the following formula:

Total area=Area of $C1$ to $n$-$C5$ Compounds+Area of $n$-$C5$ to $n$-$C14$ Compounds+Area of $n$-$C14$+ Compounds for 1st run+Area of $C1$ to $n$-$C5$ Compounds+Area of $n$-$C5$ to $n$-$C14$ Compounds+Area of $n$-$C14$+Compounds for 2 nd run+ ... + ... Area of $C1$ to $n$-$C5$ Compounds+Area of $n$-$C5$ to $n$-$C14$ Compounds+ Area of $n$-$C14$+Compounds for 11th run.

Calculate degree of transformation of kerogen to gas using the following formula:

Gas transformation ratio(after $nth$ run)=Sum of area of $C_1$ to $n$-$C_5$ Compounds of $1^{st}$ to $n^{th}$ run*100/ Total Area.

Calculate degree of transformation of kerogen to light oil using the following formula.

Light oil transformation ratio(after $n^{th}$ run)=Sum of area of $n$-$C_5$ to $n$-$C_{14}$ Compounds $1^{st}$ to $n^{th}$ run*100/Total Area.

Calculate degree of transformation of kerogen to heavy oil using following formula.

Heavy oil transformation ratio(after $n^{th}$ run)=Sum of area of $n$-$C_{14}$+Compounds $1^{st}$ to $n^{th}$ run*100/ Total Area.

Calculate degree of transformation of kerogen to total hydrocarbons using following formula.

Transformation ratio(after $n^{th}$ run)=(Sum of area of $C_1$ to $n$-$C_5$ Compounds of $1^{st}$ to $n^{th}$ run+Sum of area of $n$-$C_5$ to $n$-$C_{14}$ Compounds $1^{st}$ to $n^{th}$ run+ Sum of area of $n$-$C_{14}$+Compounds $1^{st}$ to $n^{th}$ run)*100/Total Area.

Calculate gas:oil generation index using the following formula:

Gas:oil generation index(for $n^{th}$ run)=(Area of $C_1$ to $n$-$C_5$ Compounds)/(Area of $n$-$C_5$ to $n$-$C_{14}$ Compounds+Area of $n$-$C_{14}$+Compounds) for $n^{th}$ run.

Figure 9:
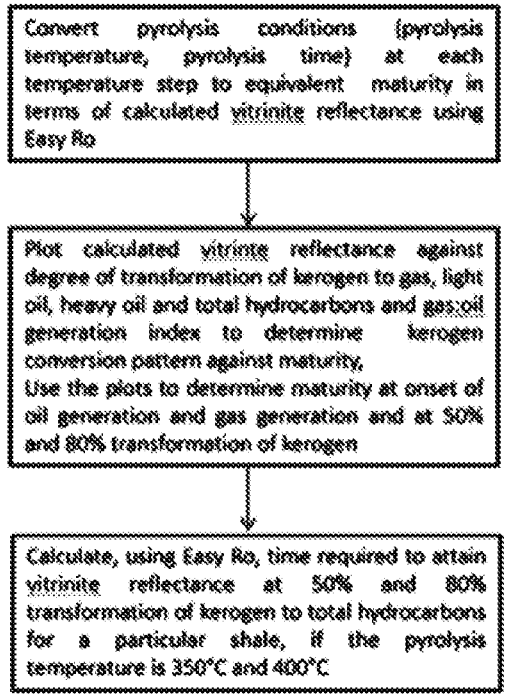
FIG. 9 illustrates step 312: a flow chart for conversion of pyrolysis conditions to equivalent maturity, in accordance with an embodiment of the present subject matter.

Referring now to FIG. 9 illustrates step 312: a flow chart for conversion of pyrolysis conditions to equivalent maturity, in accordance with an embodiment of the present subject matter. In one implementation, following steps may be performed for conversion of pyrolysis conditions to equivalent maturity:

Convert pyrolysis conditions (pyrolysis temperature, pyrolysis time) at each temperature step to equivalent maturity in terms of calculated vitrinite reflectance using Easy Ro Plot calculated vitrinte reflectance against degree of transformation of kerogen to gas, light oil, heavy oil and total hydrocarbons and gas:oil generation index to determine kerogen conversion pattern against maturity, use the plots to determine maturity at onset of oil generation and gas generation and at 50% and 80% transformation of kerogen Calculate, using Easy Ro, time required to attain vitrinite reflectance at 50% and 80% transformation of kerogen to total hydrocarbons for a particular shale, if the pyrolysis temperature is 350° C. and 400° C.

Figure 10:
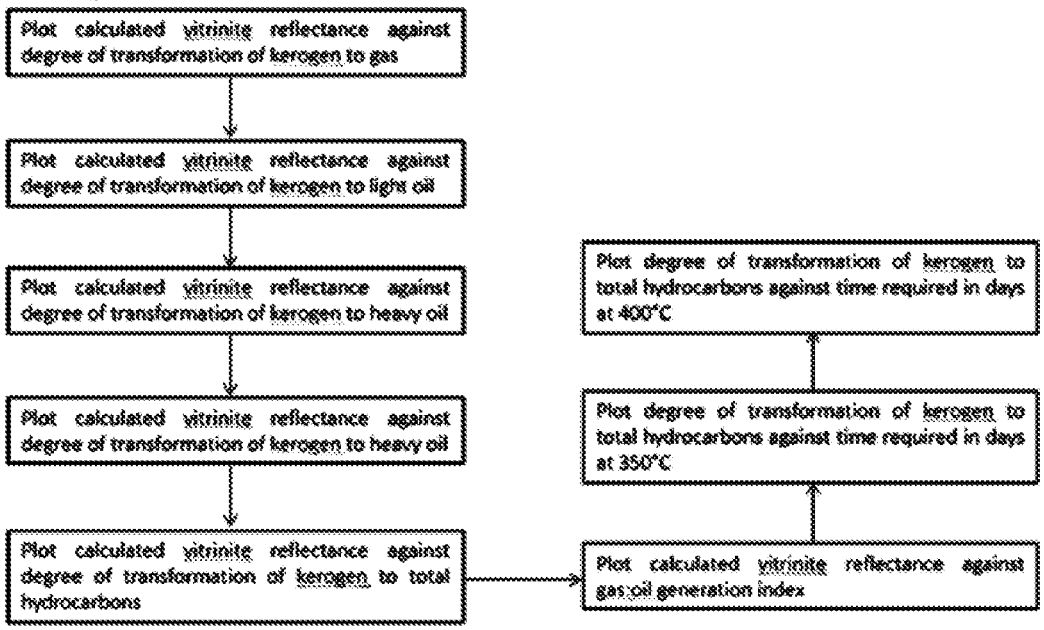
FIG. 10 illustrates step 314: a flow chart for plotting of data, in accordance with an embodiment of the present subject matter.

Referring now to FIG. 10 illustrates step 314: a flow chart for plotting of data, in accordance with an embodiment of the present subject matter. In one implementation, following steps may be performed for plotting of data:

Plot calculated vitrinite reflectance against degree of transformation of kerogen to gas.

Plot calculated vitrinite reflectance against degree of transformation of kerogen to light oil.

Plot calculated vitrinite reflectance against degree of transformation of kerogen to heavy oil.

Plot calculated vitrinite reflectance against degree of transformation of kerogen to total hydrocarbons.

Plot calculated vitrinite reflectance against gas:oil generation index.

Plot degree of transformation of kerogen to total hydrocarbons against time required in days at 350° C.

Plot degree of transformation of kerogen to total hydrocarbons against time required in days at 400° C.

EXAMPLES OF APPLICATION OF THE PRESENT INVENTION

Petroleum System Modelling Studies: During petroleum system modeling studies, a detailed petroleum system model of the basin is built. The model describes the following processes active in a petroleum system:

Generation of hydrocarbons in a source rock,
Expulsion of hydrocarbons from source rock,
Migration of hydrocarbons from source rock to reservoir rock,
Entrapment of hydrocarbons in a reservoir rock.

A petroleum system model helps in identifying areas that are prospective for hydrocarbon exploration as shown in FIG. 1. In order to calibrate the model, large amount of geochemical data related to organic richness, organic matter type and maturity of the source rocks is needed. Further, it is also important to know how much percentage of kerogen in the source rock is converted in to hydrocarbons at any maturity level. The transformation of kerogen to hydrocarbons is calculated theoretically by the petroleum system modeling software based on kinetics parameter of the kerogen (Activation Energy and Arrhenius Constant). With this technique, it is possible to actually determine the transformation ratio of the kerogen at any maturity level and this data may be used to calibrate the hydrocarbon generation in a petroleum system model.

Figure 11:
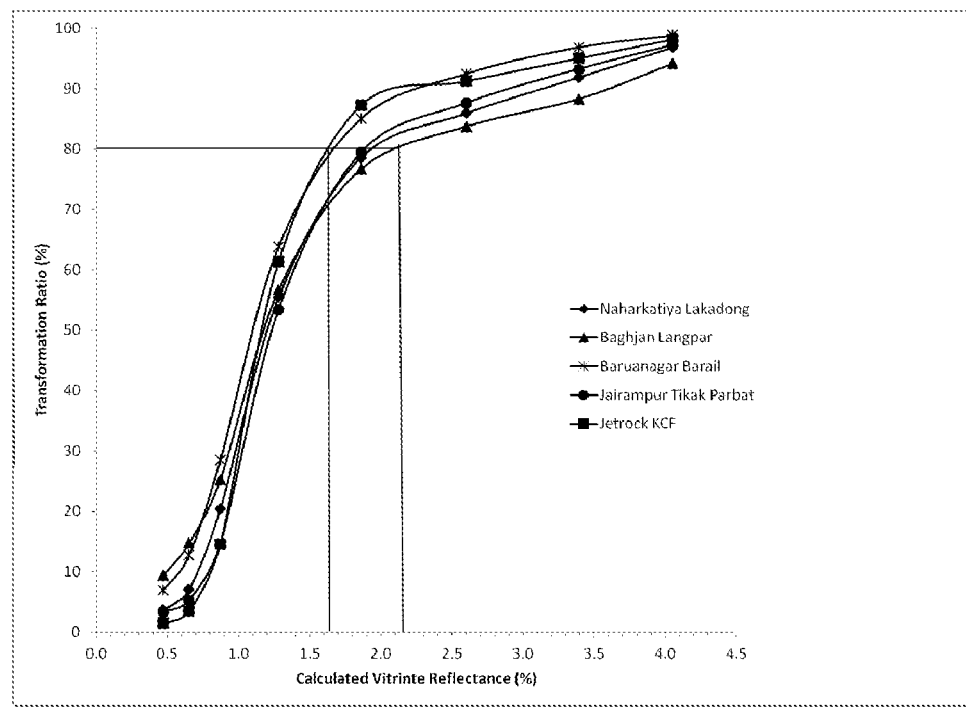
FIG. 11 illustrates a variation in total transformation ratio of kerogen with shale maturity as determined by step wise pyrolysis gas chromatographic technique, using a system, in accordance with an embodiment of the present subject matter.

Referring now to FIG. 11 illustrates a variation in total transformation ratio of kerogen with shale maturity as determined by step wise pyrolysis gas chromatographic technique, using a system, in accordance with an embodiment of the present subject matter. In one implementation, FIG. 11 shows the change in transformation ratio for the conversion of kerogen to hydrocarbons for four different shale samples from Upper Assam Basin and one shale sample from North Sea. It may be seen that to achieve the same level of transformation of kerogen (80%), Baghjan Langpar shale requires a much higher level of maturity (VRo~2.2%) compared to Jet Rock KCF shale (VRo~1.6%). Thus, within the same basin, different shales have different transformation ratios at same maturity levels. Therefore, transformation ratio determined using this technique is extremely useful to calibrate the hydrocarbon generation in a basin.

Figure 12:
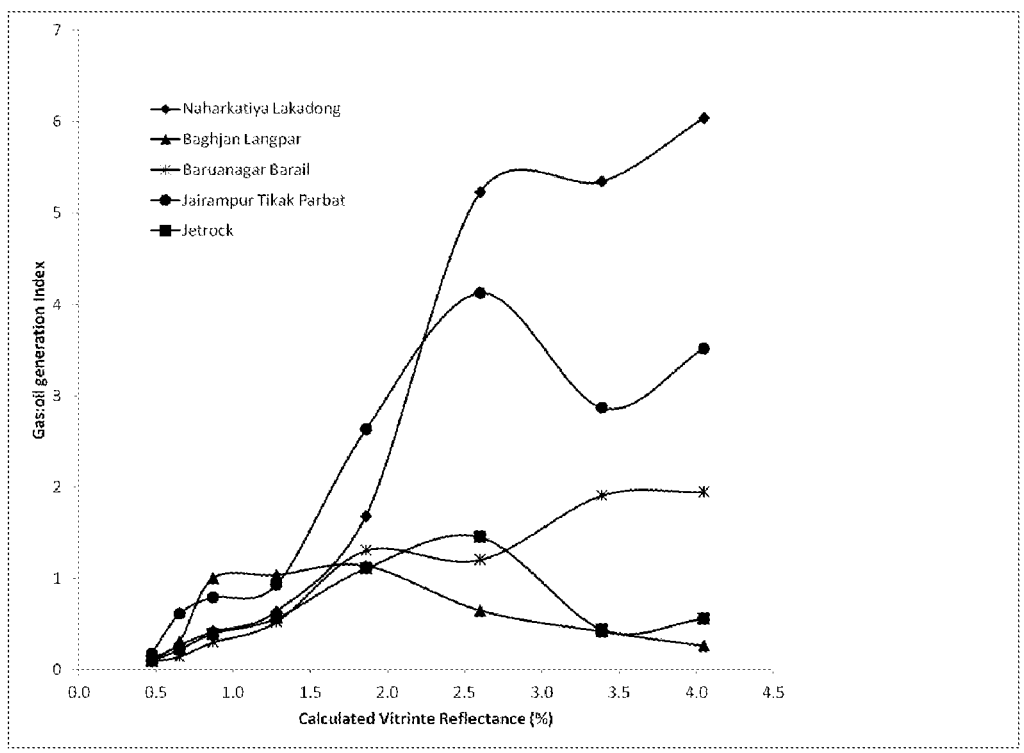
FIG. 12 illustrates a variation in gas:oil generation index (GOGI) of kerogen with shale maturity as determined by step wise pyrolysis gas chromatographic technique, in accordance with an embodiment of the present subject matter.

Referring now to FIG. 12 illustrates a variation in gas:oil generation index (GOGI) of kerogen with shale maturity as determined by step wise pyrolysis gas chromatographic technique, in accordance with an embodiment of the present subject matter. In one implementation, in addition to the transformation ratio, the gas:oil generation index (GOGI) is another parameter that needs to be calibrated during petroleum system modeling studies. Since this technique may measure the fraction of kerogen converted to gas, light oil and heavy oil, GOGI, defined as amount of gas/amount of oil generated by kerogen at any maturity level may be calculated. FIG. 12 shows the variation of GOGI with maturity for different shales. It may be seen that Naharkatiya Lakadong shale generates hydrocarbons with highest gas content whereas Baghjan Langpar shale generates hydrocarbons with lowest gas content. Thus, this data is very important to calibrate gas and oil generation from a source rock in a basin.

Figure 13:
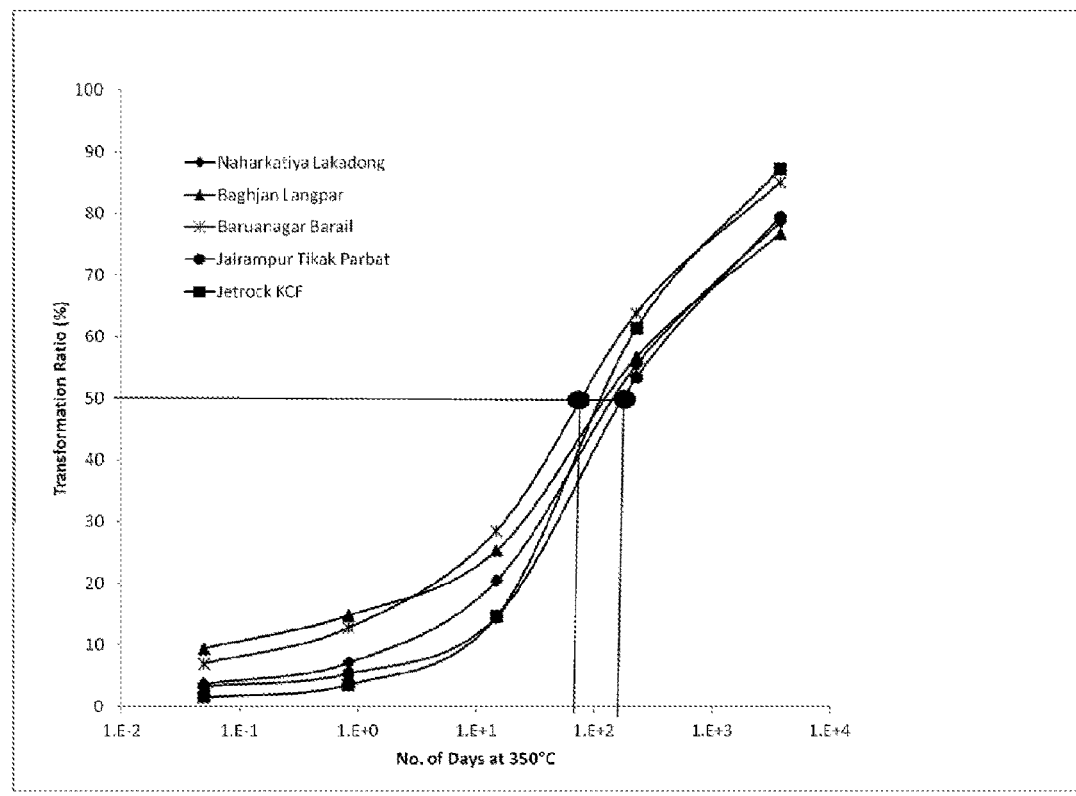
FIG. 13 illustrates a variation in total transformation ratio of kerogen with time required (in days) when the shale is heated at 350° C., as determined by step wise pyrolysis gas chromatographic technique, in accordance with an embodiment of the present subject matter.

Optimizing the conditions required for converting oil shale in to hydrocarbons under in situ conditions or in a process plant: An oil shale is an immature source rock which may generate hydrocarbons when it is heated, either in a process plant after mining or in situ in the subsurface, to convert the kerogen in the shale in to hydrocarbons as shown in FIG. 2. Oil shale is generally heated in the temperature range of 350° C. to 400° C. for prolonged period of times to convert the kerogen in to hydrocarbons. Using this technique, transformation ratio of an oil shale to hydrocarbons at any maturity level may be determined. Using Easy Ro, it is possible to determine the heating time required to attain the same transformation ratio at temperatures of 350° C. and 400° C. or any other temperature. Referring now to FIG. 13 illustrates a variation in total transformation ratio of kerogen with time required (in days) when the shale is heated at 350° C., as determined by step wise pyrolysis gas chromatographic technique, in accordance with an embodiment of the present subject matter. FIG. 13 shows the time required to attain 50% transformation ratio when different shales are heated at 350° C. It may be seen that it takes around 80 days to transform 50% of the kerogen in Baruanagar Barail shale to hydrocarbons whereas time taken by Jairampur Tikak Parbat for 50% conversion of kerogen to hydrocarbon is around 180 days.

Figure 14:
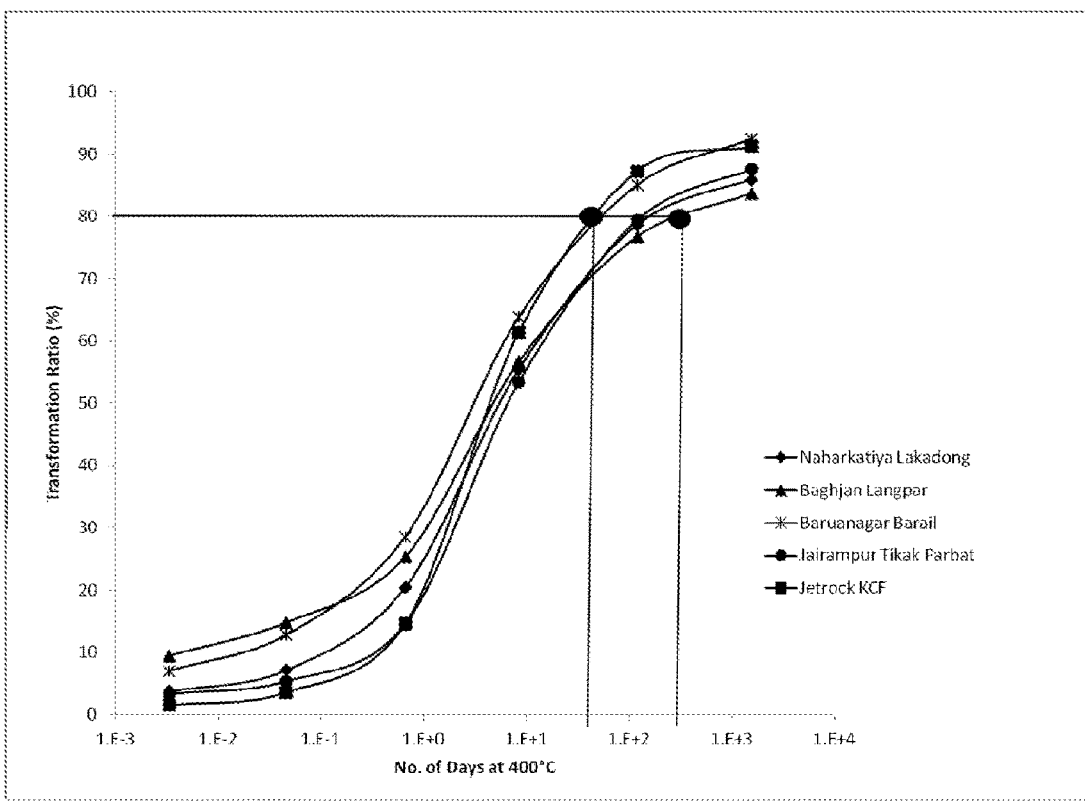
FIG. 14 illustrates a variation in total transformation ratio of kerogen with time required (in days) when the shale is heated at 400° C., as determined by step wise pyrolysis gas chromatographic technique, in accordance with an embodiment of the present subject matter.

Referring now to FIG. 14 illustrates a variation in total transformation ratio of kerogen with time required (in days) when the shale is heated at 400° C., as determined by step wise pyrolysis gas chromatographic technique, in accordance with an embodiment of the present subject matter. In one implementation, FIG. 14 shows that when Jet Rock KCF shale is heated at 400° C. for 50 days, 80% of the kerogen is transformed in to hydrocarbons. However, for the same transformation of kerogen, Baghjan Langpar shale requires 300 days. Thus, heating time and temperature required to convert an oil shale to hydrocarbons may be optimized using this technique.

Figure 15:
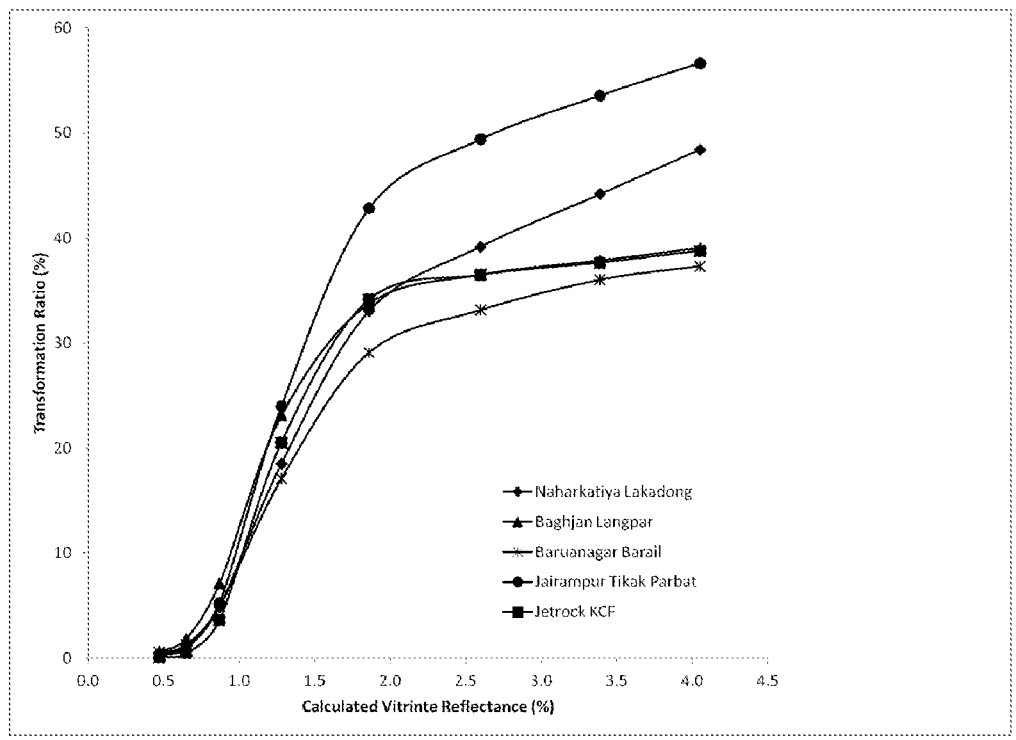
FIG. 15 illustrates a variation in gas transformation ratio of kerogen with shale maturity as determined by step wise pyrolysis gas chromatographic technique, in accordance with an embodiment of the present subject matter.

Evaluation of the shale for its potential to generate hydrocarbons at different maturity levels: Kerogen in different shales have different transformation ratio to hydrocarbons at same maturity level. Using this technique, it is possible to determine the fraction of kerogen that will convert to gas, light oil or heavy oil at any maturity level. Referring now to FIG. 15 illustrates a variation in gas transformation ratio of kerogen with shale maturity as determined by step wise pyrolysis gas chromatographic technique, in accordance with an embodiment of the present subject matter. FIG. 15 shows the variation in gas transformation ratio for kerogen in different shales, as determined by this technique. It may be seen that gas transformation ratio is highest for Jairampur Tikak Parbat shale and lowest for Baruanagar Barail shale at any maturity level. Thus, it is possible to evaluate the gas generation potential of shale at any maturity level, using this technique.

Figure 16:
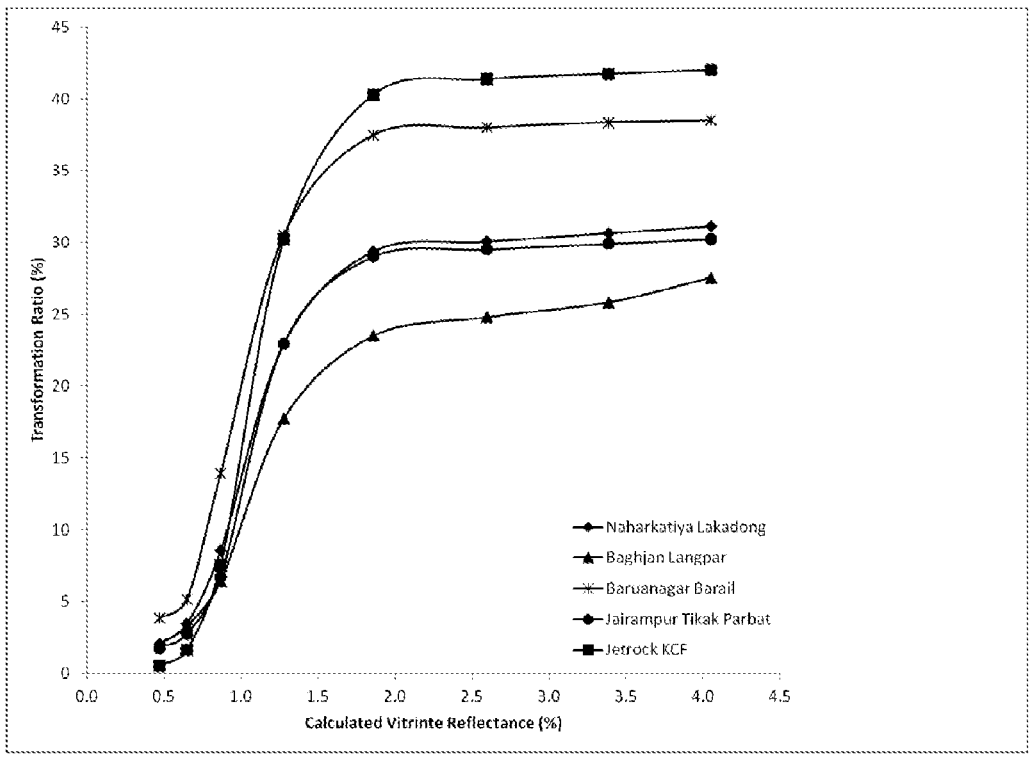
FIG. 16 illustrates a variation in light oil transformation ratio of kerogen with shale maturity as determined by step wise pyrolysis gas chromatographic technique, in accordance with an embodiment of the present subject matter.

Referring now to FIG. 16 illustrates a variation in light oil transformation ratio of kerogen with shale maturity as determined by step wise pyrolysis gas chromatographic technique, in accordance with an embodiment of the present subject matter. Similar to gas transformation ratio, the variation in light oil transformation ratio may also be plotted against the maturity as shown in FIG. 16. It may be seen that Jet Rock KCF has the highest transformation ratio for generation of light oil and Baghj an Langpar shale has the lowest transformation ratio for generation of light oil. Thus, using this technique, the shale oil potential of different shales maybe evaluated.

Figure 17:
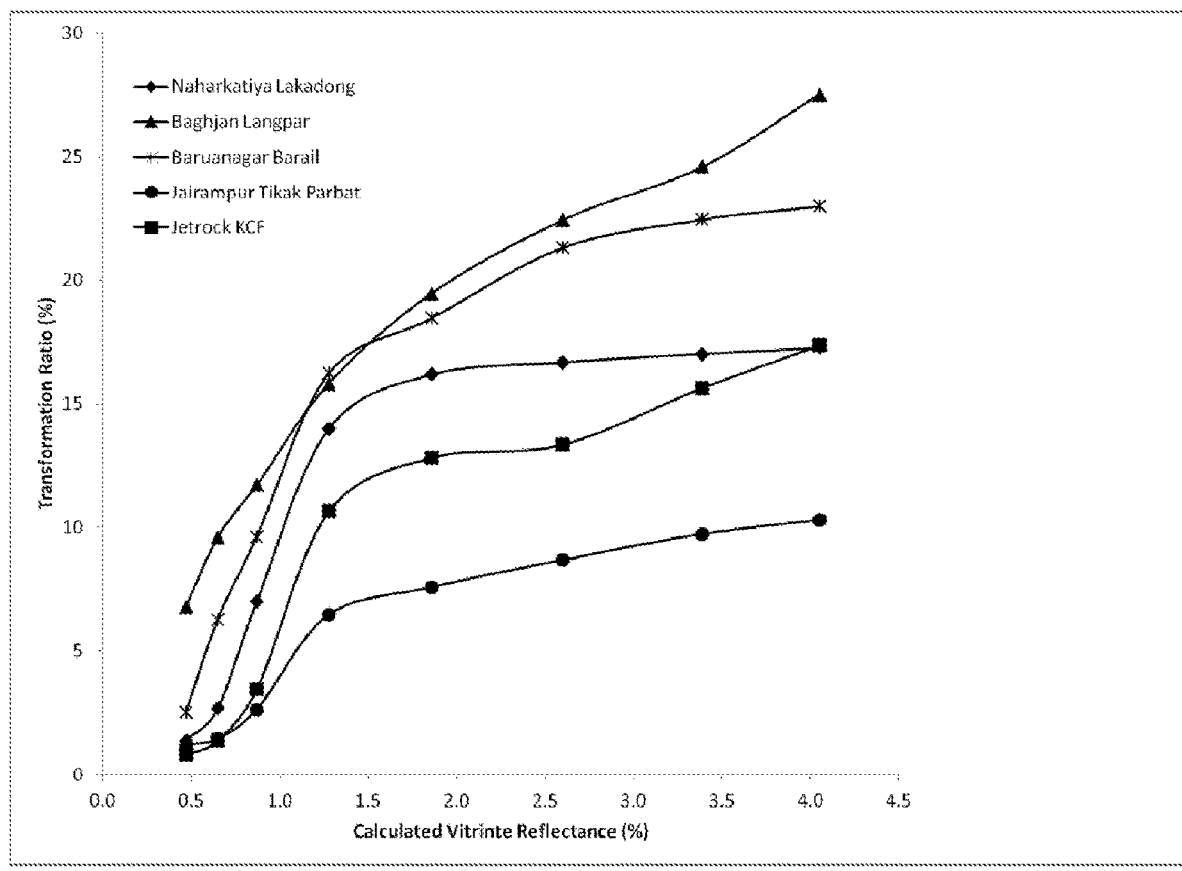
FIG. 17 illustrates a variation in heavy oil transformation ratio of kerogen with shale maturity as determined by step wise pyrolysis gas chromatographic technique, in accordance with an embodiment of the present subject matter.

In addition to gas and light oil transformation ratio, the variation in heavy oil transformation ratio with maturity may also be determined. Referring now to FIG. 17 illustrates a variation in heavy oil transformation ratio of kerogen with shale maturity as determined by step wise pyrolysis gas chromatographic technique, in accordance with an embodiment of the present subject matter. FIG. 17 shows that Kerogen in Baghjan Langpar shale will transform the most to heavy oil and kerogen in Jairampur Tikak Parbat shale will transform the least to heavy oil with increasing maturity.

As compared to the prior-art techniques, the present invention key discloses the pyrolysis of kerogen in the shale at increasing temperatures in a step-wise manner and analyzing the pyrolysis products generated by the kerogen at each temperature using a gas chromatograph to determine the fraction of gas, light oil and heavy oil. Further, pyrolysis at increasing temperatures is converted to equivalent maturity of the rock and degree of transformation of kerogen to total hydrocarbons, gas, light oil and heavy oil at each maturity level maybe determined.

Finally, it should be understood that the above embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application.

The invention claimed is:

1. A method for evaluating a degree of transformation ratio of kerogen to oil and/or gas and gas to oil generation index using a pyrolysis gas chromatography, said method comprising:
    providing a rock sample in powdered form;
    determining a predefined condition, by a source rock analysis instrument, in terms of total organic carbon (TOC) in said rock sample, remaining hydrocarbon generation potential (S2) in rock sample, and a maturity (Tmax) of rock sample;
    feeding said sample in a tube of a pyrolyzer if said sample satisfies the pre-defined condition;
    analyzing, said sample in said pyrolyzer, by heating said sample in a step-wise manner at a pre-specified pyrolysis temperature between 300° C. and 800° C. in pre-specified pyrolysis steps of 50° C. and for pre-specified pyrolysis time of 40s;
    converting pyrolysis conditions (pyrolysis temperature and pyrolysis time) at each step, into equivalent maturity in terms of calculated vitrinite reflectance;
    determining, by a gas chromatograph, a peak area of hydrocarbons present in said sample analyzed;
    evaluating, by said gas chromatograph, said degree of transformation ratio of said sample to oil and/or gas and/or said gas to oil generation index at each pyrolysis step.

2. The method as claimed in claim 1, wherein evaluating said transformation of said sample to said oil and/or gas and/or said gas to oil generation index at different pyrolysis temperatures using a step-wise pyrolysis-gas chromatography.

3. The method as claimed in claim 1, wherein said sample is a kerogen-rich sample preferably selected from a shale rock.

4. The method as claimed in claim 1, wherein said pyrolyzer comprises at least one auto-sampler, at least one pyrolysis chamber, and at least one control unit.

5. The method as claimed in claim 4, wherein said sample is fed in pyrolysis chamber, preferably a quartz tube, of said pyrolyzer enclosed in said auto-sampler and said pyrolyzer is controlled using said control unit, preferably comprising at least one controlling software.

6. The method as claimed in claim 1, wherein said gas chromatograph comprises at least one injector, at least one capillary column, and at least one flame ionization detector, and said gas chromatograph is controlled preferably using at least one controlling software.

7. The method as claimed in claim 6, wherein after pyrolyzing the said sample at the said pyrolysis step, the pyrolysate from said sample from said pyrolyzer is transferred to said gas chromatograph using at least one transfer line, said transfer line preferably maintained at 300° C., and said capillary column in said gas chromatograph is adapted to separate hydrocarbons present in said sample to be detected by said ionization detector.

8. The method as claimed in claim 1, before analyzing comprises:
    injecting, in said injector, n-alkanes comprising n-hexane (C6H12), n-heptane (C7H14), n-dodecane (C12H26), n-hexadecane (C16H34), n-eicosane (C20H42), n-tetracosane (C24H50) and n-octacosane (C28H58);
    analyzing, by said capillary column, said n-alkanes, preferably from C5 to C30 for determining retention time for said n-alkanes;
    dividing, using said controlling software, a chromatogram preferably into three parts based on said retention time determined of said n-alkanes, wherein said chromatogram depicts at least one of:
        an area of all the peaks eluting before n-C5 correspond to gaseous fraction (C1 to n-C5); or
        an area of all the peaks eluting between n-C5 and n-C14 corresponds to light oil;
    or
        and area of all the peaks eluting beyond n-C14 corresponds to heavy oil generated during pyrolysis of said sample; or combination thereof.

9. The method as claimed in claim 1, wherein said predefined condition preferably is, said sample is fed if said TOC>2%, said (S2)>5 mg/g and said (Tmax)<435° C.

10. The method as claimed in claim 1, wherein said sample is heated, preferably, at pre-specified pyrolysis temperature from 300° C. to 800° C. in said pre-specified pyrolysis steps of 50° C. and for said pre-specified pyrolysis time 40 seconds in a step-wise manner.

11. The method as claimed in claim 1, wherein said degree of transformation ratio of kerogen to oil and/or gas, at nth pyrolysis step, is determined, preferably using an equation: (sum of area of C1 to n-C5 Compounds of 1st to nth pyrolysis step+Sum of area of n-C5 to n-C14 Compounds 1st to nth pyrolysis step+Sum of area of n-C14+Compounds 1st to nth pyrolysis step)*100/Total Area, where Total Area is the sum of the area of all pyrolysis products over all the pyrolysis steps.

12. The method as claimed in claim 1, wherein said gas to oil generation index said sample is determined, preferably using an equation: (Area of C1 to n-C5 Compounds)/(Area of n-C5 to n-C14 Compounds+Area of n-C14+Compounds) for nth pyrolysis step.

13. The method as claimed in claim 1, wherein said method comprises determining a conversion of said pre-specified pyrolysis temperature and time to an equivalent maturity in terms of calculated vitrinite reflectance.

14. The method as claimed in claim 13, further comprises plotting (314) a graph depicting said calculated vitrinite reflectance against said degree of transformation attained by said sample after each pyrolysis step.

15. The method as claimed in claim 1, wherein said transformation ratio of said sample to oil and/or gas corresponds to a fraction of said kerogen that is converted into hydrocarbons.

* * * * *